United States Patent
Velesík

[11] 3,876,292
[45] Apr. 8, 1975

[54] REPRODUCTION LENS SYSTEM
[75] Inventor: Stanislav Velesík, Prerov, Czechoslovakia
[73] Assignee: MEOPTA, narodni podnik, Prerov, Czechoslovakia
[22] Filed: Oct. 18, 1973
[21] Appl. No.: 407,617

[30] Foreign Application Priority Data
Oct. 20, 1972 Czechoslovakia .................. 7064-72

[52] U.S. Cl. ............................................. 350/227
[51] Int. Cl. ............................................. G02b 9/20
[58] Field of Search .................................. 350/227

[56] References Cited
FOREIGN PATENTS OR APPLICATIONS
474,815  11/1937  United Kingdom ................. 350/227
1,017,381  10/1957  Germany .......................... 350/227

Primary Examiner—John K. Corbin
Attorney, Agent, or Firm—Murray Schaffer

[57] ABSTRACT

An objective lens system comprising three optical members arranged axially in such a way that the first member nearest to the image plane consists of a single biconvex lens, the middle member a single biconcave lens and the third member consists of two lenses cemented together, namely a biconcave and a biconvex one. The components have the following conditions:

$$f_B < f_C < f_A$$
$$0.9 F < (f_A + F_B + f_C)$$
$$r_6 < r_1 < r_7$$
$$(m_1 + d_2) < 1.1 \, d_1$$
$$(m_1 + d_2) < 1.1 \, m_2$$

where
F is the focal distance of the optical system of the entire objective
$f_A$ is the focal distance of the first member A
$f_B$ is the focal distance of the middle member B
$f_C$ is the focal distance of the biconcave lens $C_1$ of the third member C
$r_1$, $r_6$, $r_7$ are the radii of curvature of the respective refractive surface
$d_1$, $d_2$ are the axial thicknesses of the respective lenses
$m_1$, $m_2$ are the distances of the axial air gaps between the individual optical members.

2 Claims, 1 Drawing Figure

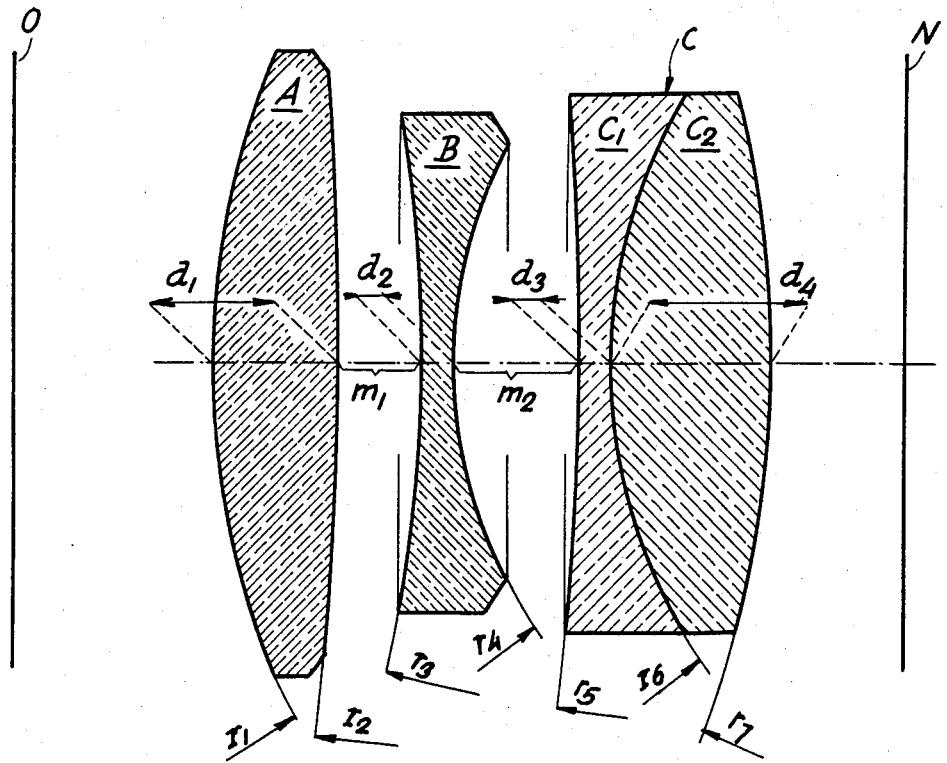

REPRODUCTION LENS SYSTEM

BACKGROUND OF THE INVENTION

The invention refers to the optical system and particularly to an objective lens system for enlarging purposes.

The objective lens of the present invention belongs through its optical design to those types of objective systems that are commonly used, both for initial photographic and, mainly, for reproduction enlarging purposes. Despite the fact that generally such optical systems contain a relatively small number of optical elements, it is suitable as far as quality of the reproduced image is concerned for general applications. However, a serious drawback is inherent in these known systems in that its resolving power, at differing sizes of magnification being reproduced, differs drastically. Thus for instance a magnifying objective having a focal distance of 80 mm and designed for the reproduction of an original 60 × 60 mm, has a rule of magnification range from 2 to 6 ×. Nevertheless the optimum resolving power of the objective is usually located at the middle magnification range, (i.e. at approximately 4 ×) and at extreme magnifications, especially at small ones, the image quality is very poor. Similarly the distribution of light in the image field of the original being reproduced is also poor. At small magnifications the decrease of light in the corners of the format often reaches a value of over 50 per cent. This loss of a substantial portion of the light on the format seriously effects the quality of the image reproduced. It further reduces the effectiveness of the improved quality of photographic lenses and the more perfect illuminating systems of the enlargers being developed at this time. In an attempt to improve these criterions, objective lens systems of a more complex design are used, in which special types of optical glass are often employed. As a result production costs and hereby the consumer price is proportionally increased.

It is an object of the present invention to provide an optical objective lens system for a reproduction objective which overcomes the disadvantages of the prior art.

It is an object of this invention to provide a lens system of the type disclosed which produces enlargement of good image quality over a wide magnification range.

It is a further object of the present invention to provide a lens system constructed from a minimum number of components employing ordinary optical glass.

It is the object of the present invention to provide an objective of simple optical structure, having improved resolving power and more uniform distribution of light in the image plane of the whole reproduced format.

These objects and other advantages of the present invention will be seen from the following disclosure of the present invention.

SUMMARY OF THE INVENTION

According to the present invention there is provided an objective for enlarging purposes, comprising three optical members arranged axially in such a way that the first member arranged nearest to the image plane consists of a single biconvex lens and the middle member of a single biconcave lens, the third member consisting of a biconcave lens and a biconvex lens cemented together.

Full details of the present invention are given in the following description and are illustrated in the accompanying drawings.

BRIEF DESCRIPTION OF THE DRAWING

The FIGURE of the drawing is a schematic sectional view along the optical axis of the lens system of the present invention.

DESCRIPTION OF THE INVENTION

As seen in the drawing, the lens system of the present invention comprises three components A, B and C arranged on the optical axis between an image plane O and a negative plane N. The first component A is a simple biconvex lens element nearest to the image plane O. The second or middle component B is formed by a simple biconcave element and the third component C is a cemented two element biconcave-biconvex lens, near the negative plane N. The individual radii of curvature of refracting surfaces taken from the direction of the image plane O are labelled $r_1$–$r_7$, the axial thicknesses of individual lenses are labelled $d_1$–$d_4$ and the airspaces between the individual components are labelled $m_1$ and $m_2$. The lenses are arranged concentrically along the common optical axis and may be housed in a suitable tube or box like housing.

The radius of curvature of the first refractive surface $r_1$ of the first member A is smaller than the radius of curvature of the second refractive surface $r_2$. The middle member B has a radius of curvature of the third refractive surface $r_3$ greater than the radius of curvature of the fourth refractive surface $r_4$. The third member C consists of two lenses cemented together, namely a biconcave lens $C_1$ with radii of curvature of the refractive surfaces $r_5$ and $r_6$, the radius of curvature of the seventh refractive surface $r_7$ situated nearest to the plane of the negative N being greater than the radius of curvature of the sixth refractive surface $r_6$.

The advantages of the present invention are obtained preferably when:

The absolute value of the focal distance of the biconcave lens of the third member C is greater than that of the second member B, but smaller than the focal distance of the first member A and the 0.9 multiple of the focal distance of the optical system of the whole objective is smaller than the sum of the focal distances of the first member A and of the absolute values of focal distances of the second member B and of the biconcave lens $C_1$ of the third member. The radius of curvature of the first refractive surface $r_1$ is also greater than the radius of curvature of the sixth refractive surface $r_6$, but smaller than the absolute value of the radius of curvature of the seventh refractive surface $r_7$. The 1.1 multiple of the axial thickness $d_1$ of the first member is greater than the sum of the axial air gap $m_1$ between the first and the second member and the axial thickness of the second member and the 1.1 multiple of the axial air gap $m_2$ between the second and third member is greater than the sum of the axial air gap $m_1$ between the first and the second member and the axial thickness $d_2$ of the second member.

As a result of establishing this above relationship, the objects ennumerated earlier are obtained. That is a simple objective made of a minimum number of components is provided with which magnification, at least in the 2 × to 6 × range can be obtained. Further, the lens system will result in little if any distortion and will give full light distribution.

In the following table the parameters of an exemplary embodiment of a reproduction objective are given for an aperture f/4.5 and focal length F=100 mm and a speed of 1:4.5 by which the objective is suitable for 2-6× magnification range regarding to its state of correction.

| | | $n_e$ | $\nu$ |
|---|---|---|---|
| $r_1 = + 25.88$ | | | |
| | $d_1 = 5.06$ | 1.62554 | 57.87 |
| $r_2 = - 997.1$ | | | |
| | $m_1 = 3.5$ | air gap | |
| $r_3 = - 60.39$ | | | |
| | $d_2 = 1.44$ | 1.57832 | 41.04 |
| $r_4 = + 22.44$ | | | |
| | $m_2 = 5$ | air gap | |
| $r_5 = - 113.13$ | | | |
| | $d_3 = 1.44$ | 1.52875 | 50.7 |
| $r_6 = + 23.28$ | | | |
| | $d_4 = 6.63$ | 1.64128 | 55.29 |
| $r_7 = - 38.99$ | | | | all dimensional parameters of the above objective being changeable in the range of ±3%, without substantial change of its correction state and hereby deterioration of the image quality.

In the above table $r_1$ through $r_7$ denote the radii of curvature of the individual refractive surfaces, $d_1$ through $d_4$ the axial thicknesses of the individual lenses, $m_1$ and $m_2$ the air gaps between the individual optical members, $n_e$ the refractive index for the spectral line $e$, and $\nu$ the Abbe number.

In the foregoing example the conventional measurements are in millimeters.

The focal distances of the individual optical elements of the system, whose mutual coupling forms the substance of the invention, have the following values:

$$F = 100 \text{ mm}$$
$$f_A = 40.38$$
$$f_B = -28.1$$
$$f_{C_1} = -36.35$$

where F is the focal distance of the optical system of the whole objective,
$f_A$ the focal distance of the first member A,
$f_B$ the focal distance of the middle member B, and
$f_{C_1}$ the focal distance of the biconcave lens $C_1$ of the third member C.

As has been indicated, the optical system of the solved objective is especially advantageous for objectives designed for enlarging purposes. Its numerical parameters reduced in such a way that the resulting focal distance of the objective be 80 mm ensure its good definition over the entire magnification range from 2 to 6 × for the format of the negative 60 × 60 mm. The decrease of light in the corners of the whole format at a speed of 1:4.5 is not especially evident.

It will be obvious that the present disclosure is illustrative only of the various embodiments possible. It is therefore intended that it should not be limiting of the scope of the invention except as defined in the appended claims.

What is claimed is:

1. An optical objective lens system comprising three axially arranged optical members, the first member being arranged nearest to the image plane comprises a single biconvex lens, the middle member comprises a single biconcave lens, and the third member comprises a biconcave lens and a biconvex lens cemented together, said system complying with the following conditions:

| | | $n_e$ | $\nu$ |
|---|---|---|---|
| $r_1 = + 25.88$ | | | |
| $r_2 = - 997.1$ | $d_1 = 5.06$ | 1.62554 | 57.87 |
| $r_3 = - 60.39$ | $m_1 = 3.5$ | air gap | |
| $r_4 = + 22.44$ | $d_2 = 1.44$ | 1.57832 | 41.04 |
| $r_5 = - 113.13$ | $m_2 = 5$ | air gap | |
| $r_6 = + 23.28$ | $d_3 = 1.44$ | 1.52875 | 50.7 |
| $r_7 = - 38.99$ | $d_4 = 6.63$ | 1.64128 | 55.29 |

$n_e$ is the refractive index for the spectral line e, and
$\nu$ is the Abbe number.

2. The system according to claim 1 having the following values:

$$F = 100 \text{ mm}$$
$$f_A = 40.38$$
$$f_B = -28.1$$
$$f_{C_1} = -36.35$$

where:
F is the focal distance of the optical system of the whole objective,
$f_A$ the focal distance of the first member A,
$f_B$ the focal distance of the middle member B, and
$f_{C_1}$ the focal distance of the biconcave lens $C_1$ of the third member C.

* * * * *